United States Patent
Toncelli

(10) Patent No.: US 12,037,285 B2
(45) Date of Patent: Jul. 16, 2024

(54) METHOD FOR MANUFACTURING SLAB ARTICLES FROM A BASE MIX, GLASS FRIT FOR MANUFACTURING THE BASE MIX AND SLAB ARTICLES SO OBTAINED

(71) Applicant: Luca Toncelli, Bassano del Grappa (IT)

(72) Inventor: Luca Toncelli, Bassano del Grappa (IT)

( * ) Notice: Subject to any disclaimer, the term of this patent is extended or adjusted under 35 U.S.C. 154(b) by 223 days.

(21) Appl. No.: 17/415,973

(22) PCT Filed: Dec. 18, 2019

(86) PCT No.: PCT/IB2019/060999
§ 371 (c)(1),
(2) Date: Jun. 18, 2021

(87) PCT Pub. No.: WO2020/128885
PCT Pub. Date: Jun. 25, 2020

(65) Prior Publication Data
US 2022/0112122 A1 Apr. 14, 2022

(30) Foreign Application Priority Data

Dec. 21, 2018 (IT) .................. 102018000020920

(51) Int. Cl.
| | | |
|---|---|---|
| C03C 8/02 | (2006.01) | |
| C03B 19/06 | (2006.01) | |
| C03C 10/00 | (2006.01) | |

(52) U.S. Cl.
CPC .............. *C03C 8/02* (2013.01); *C03B 19/063* (2013.01); *C03C 10/0036* (2013.01)

(58) Field of Classification Search
CPC ....... C03C 8/02; C03C 10/00; C03C 10/0009; C03C 10/0036
See application file for complete search history.

(56) References Cited

U.S. PATENT DOCUMENTS

| | | | |
|---|---|---|---|
| 5,830,251 A | 11/1998 | Simpson et al. | |
| 2008/0041106 A1 | 2/2008 | Seneschal-Merz et al. | |
| 2021/0380472 A1* | 12/2021 | Toncelli | .................... C03C 8/02 |

FOREIGN PATENT DOCUMENTS

| | | | |
|---|---|---|---|
| EP | 0378275 B1 | 4/1996 | |
| IT | 1293176 T | 2/1999 | |
| IT | TV20030006 A1 | 7/2004 | |
| IT | RE20100087 | 4/2012 | |
| KR | 1670686 B1 * | 10/2016 | ............. C04B 33/04 |
| WO | 2006018580 A2 | 2/2006 | |
| WO | 2006084827 A1 | 8/2006 | |
| WO | 2008117193 A2 | 10/2008 | |
| WO | 2018189663 A1 | 10/2018 | |

OTHER PUBLICATIONS

Sintering, Wikipedia, downloaded Aug. 10, 2023 (Year: 2023).*
PCT International Search Report and Written Opinion dated Mar. 30, 2020 for Intl. App. No. PCT/IB2019/060999, from which the instant application is based, 9 pgs.
Canadian Intellectual Property Office "Office Action" From Application No. 3,124,305, Dated Apr. 5, 2024, pp. 1-5.

* cited by examiner

*Primary Examiner* — Karl E Group
(74) *Attorney, Agent, or Firm* — Fredrikson & Byron, P.A.

(57) ABSTRACT

Method for manufacturing slab articles from a mix, comprising the steps of a) preparing a mix comprising a preponderant amount of a glass frit and a binder, b) distributing the mix in a support, c) compacting the mix, d) drying the mix, e) sintering the mix and f) cooling the article. The glass frit comprises a weight amount of silica ($S_iO_2$) comprised between 62% and 68%, a weight amount of alumina ($Al_2O_3$) comprised between 3% and 5%, a weight amount of potassium oxide ($K_2O$) comprised between 3% and 5%, a weight amount of calcium oxide (CaO) comprised between 18% and 26% and a weight amount of magnesium oxide (MgO) comprised between 1% and 4% The cooling step is performed in a controlled manner by modulating the cooling speed in a temperature range not greater than 1.160° C. and not less than 1.000° C. in order to perform the at least partial devitrification and crystallization of the glass frit. The invention also relates to a glass frit and an article in slab form.

16 Claims, No Drawings

METHOD FOR MANUFACTURING SLAB ARTICLES FROM A BASE MIX, GLASS FRIT FOR MANUFACTURING THE BASE MIX AND SLAB ARTICLES SO OBTAINED

RELATED APPLICATIONS

This application is a 35 U.S.C. 371 national stage filing from International Application No. PCT/IB2019/060999, filed Dec. 18, 2019, which claims priority to Italian Application No. 102018000020920, filed Dec. 21, 2018, the teachings of which are incorporated herein by reference.

The present invention relates to the manufacture of articles, preferably in the form of a slab and white in colour, from a base mix. Conveniently, the mix contains a vitreous material, preferably a glass frit, and the resultant material of the finished slab articles is a glass-ceramic material.

Below, the term "glass ceramic" will indicate materials which have some of the properties both of glass and of ceramics. In particular, glass ceramics have an amorphous phase which is typical of glass and one or more crystalline phases which are typical of ceramic material and are produced by means of so-called "controlled crystallization", different from the spontaneous crystallization which is usually undesirable during the manufacture of glass.

The present invention relates firstly to a method for manufacturing slab articles, which are preferably white in colour, from a base mix containing a vitreous material.

The invention also relates to a glass frit for producing a base mix and a slab article, which is preferably white in colour, obtained from the base mix by means of the aforementioned manufacturing method.

The technology for the manufacture of the conglomerate slab articles made of ceramic material has been known for a long time; a particular well-known technology is called Lapitec® technology.

The method of forming these slabs involves the use of granulated materials, in particular ceramic material, and ceramic mineral powders, in particular feldspars, clays and kaolins.

In particular, the slab articles are obtained from a mix consisting of a granulated product, preferably in the form of sand, obtained from the granulation or grinding of ceramic materials, and a binder phase consisting of ceramic powders which are mixed with a water-based inorganic binder.

The manufacturing method involves an initial step of distribution of the mix on a forming support, a mix compaction step, a mix drying step and a mix firing step.

For a complete and exhaustive description of a method for manufacturing these ceramic articles and the corresponding details reference may be made, for example, to Italian patent IT1293176 or European parent EP378275.

This type of article is suitable for being used for the cladding of walls and floors in civil and industrial buildings, both inside and outside, as well as for the manufacture of articles such as worktops, in particular of kitchen units.

Despite the fact that these products and the method for manufacturing them are well-established on the market, they nevertheless have some limitations and there remain a number of unresolved problems and certain goals to be achieved.

A first problem consists in the fact that with the manufacturing methods described above it is possible to obtain only a limited range of aesthetic effects on the visible surfaces of the slab articles.

In particular, with these methods it is not possible to obtain slabs with a deep and translucid aesthetic effect on the external visible surfaces. In particular, it is also not possible to obtain slabs with a pure white colour comparable to that of certain qualities of white marble.

Another problem consists in the fact that the colouring of the articles obtained by means of the method described above has a limited intensity and depth.

In order to overcome at least partially these drawbacks, manufacturing methods similar to those described above which involve the use of vitreous granulated products, preferably glazes, have been developed.

In particular, Italian patent No. 1342613 deals with the technical problem of transferring the properties and the characteristics of the glazes to the mass of the manufactured article.

The method in accordance with the patent mentioned above involves, for the manufacture of these articles, essentially the same compaction steps, which in this case is vacuum vibro-compression, drying and firing as described above.

In this embodiment the base mix contains a vitreous material, in particular a ground glaze and a ventilated glaze powder.

Moreover, before the drying and firing steps, a layer of non-adhesive refractory material is applied between the support and the mix. After firing, the layer of refractory material remains incorporated within the external surface of the manufactured article.

The firing step is performed at a temperature of between 900° C. and 1000° C., preferably at 960° C., so as to cause the mix to melt. Moreover, once melting is achieved with a consequent loss of consistency, firing is performed by supporting the dried slab by means of a panel of refractory material which maintains its consistency and flatness during the heat cycle.

The main drawback of this solution lies in the fact that the article which is obtained consists practically of a slab of coloured glass, with a limited hardness, equal to about 3÷4 Mohs, and is not very resistant to scratching and wear and has a limited resistance to alkaline attack.

The present invention involves instead the use in the mix, in a preponderant amount, of a particular so-called "hard" high-melting glass frit, suitable for the manufacture of glass-ceramic slabs.

As is known, finely ground glass frits are widely used for the superficial enameling/decoration of ceramic tiles used for floors and/or wall cladding and have both an aesthetic function, since they produce a surface layer with a high-quality appearance, and a structural function, since they make the surface of the tile impermeable to liquids and gases and also resistant to scratches and abrasion.

In the present invention the mix compacted in slab form and consisting mainly and substantially of a glass frit, in an amount by weight greater than 70%, having the composition indicated in the table below, is firstly sintered by means of firing at a high temperature, in particular of between 1.150° C. and 1.220° C. and preferably close to 1.180° C.

The mix is then cooled, while ensuring that cooling is slowed down so that it remains at a temperature not higher than 1160° C. and not less than 1000° C. for a predetermined time period equal to at least one minute.

The slab which is obtained, despite the absence of white pigments in the mix, assumes a hardness greater than or equal to 5 Mohs and a white or translucid colour; a slight variation in the composition of the frit with respect to that indicated instead results in a whitish, milky, colour.

Of these two colours the white translucid colour is preferable, for which purpose the composition of the frit must remain within the temperature ranges indicated below.

This effect is due to the fact that the particular composition of the frit, together with the controlled cooling referred to above, results in its partial or total devitrification, so that the frit assumes a crystalline structure.

The glass frit used in the mix is a high-melting and so-called "hard" glass frit and is particularly suitable for the manufacture of glass-ceramic slabs.

The resultant product may be defined as being a glass-ceramic material according to the definition given above since on the one hand it has the physical and mechanical characteristics of a ceramic product and on the other hand it maintains some of the characteristics of glass.

As mentioned above, the present invention is distinguished and is characterized by two aspects, i.e. the composition and the method.

As regards the composition of the glass frit this is of the type shown below (the percentage weights are in relation to the overall weight of the glass frit):

| Component | from (% weight) | to (% weight) |
| --- | --- | --- |
| Silica ($SiO_2$) | 62 | 68 |
| Alumina ($Al_2O_3$) | 3 | 5 |
| Potassium oxide ($K_2O$) | 3 | 5 |
| Calcium oxide (CaO) | 18 | 26 |
| Magnesium oxide (MgO) | 1 | 4 |

As regards the composition, the low content of alumina, $Al_2O_3$, being present in an amount not greater than 5% by weight relative to the weight of the frit, appears to assume particular importance.

It is also pointed out that the weight amounts of the other elements must remain within the weight ranges shown above in the table.

In a manner known per se, the composition of the glass frit may also comprise traces of impurities or other elements different from those shown and added separately, such as doping elements for providing particular features. However, the content of impurities or additional elements is negligible compared to that of the elements indicated above in the table.

The iron oxide based impurities may affect the colouring of the finished slab article and therefore their content must preferably be kept as small as possible.

Advantageously, the glass frit used for producing the base mix is used on a continuous granulometric scale ranging between a few microns and a couple of millimetres.

Conveniently, the mix may contain an amount of about 5-15% by weight of feldspar and/or clay minerals, in particular kaolin, and/or similar materials, provided they are white, in order to achieve the characteristics typical of glass-ceramic materials.

Coloured pigments may also be added to the mix, in order to obtain certain chromatic effects, although the white colour obtained by means of the method described below is preferable.

In turn, the distinctive feature in terms of method of the present invention appears to be that of the at least partial devitrification and crystallization step performed by means of at least one step for controlled cooling of the unprocessed slab article, after heating to the firing temperature equal to about 1.200° C. and preferably close to 1.180° C.

The controlled cooling consists in modulating the cooling speed once the slab has already cooled to 1.160° C. within a predefined temperature range not greater than 1.160° C. and not less 1.000° C. for a predefined time period of at least one minute.

Therefore, the cooling step is controlled within a temperature range of between 1160° C. and 1000° C. for a predefined time period.

The predefined temperature range may be between 1.100° C. and 1.000° C.; in accordance with another embodiment the predefined temperature range is between 1.150° C. and 1.050° C.

However, the devitrification and crystallization may also be performed to a minimal extent also during heating.

Moreover, the glass frit devitrification and crystallization process results in a final hardness of the slab article greater than or equal to 5 Mohs.

In a manner known per se, the method comprises:
a) a step of preparing the mix comprising a preponderant amount, greater than 70% by weight, of glass frit, having the composition indicated above and at least one binder and
b) a step of distributing the base mix in a mould or forming support.

As mentioned, in this context the expression "preponderant amount" indicates an amount of glass frit greater than 70% relative to the overall weight of the mix.

Conveniently, as already mentioned above, the mix may comprise an amount of about 5-15% by weight of feldspar and/or clay minerals, in particular kaolin and/or similar materials, provided they are white.

Advantageously, the binder which forms the mix may be an organic binder and/or an inorganic binder.

Preferably, the inorganic binder is an aqueous dispersion of colloidal silica (also known as "silicasol"), while the organic binder is chosen from the group comprising polyvinyl alcohol, water-soluble cellulose or a polysaccharide.

Furthermore, distribution of the mix is performed by means of machines known in the sector, comprising for example a hopper and an extractor belt.

Optionally, after deposition of the mix in the support, a mesh of metallic or ceramic material may be embedded in the mix in order to reinforce the final structure of the article.

The method for manufacturing slab articles also comprises a step c) for compacting, preferably by means of vacuum vibro-compression, the mix contained in the support, or in the mould, a step d) of drying the compacted mix, a step e) of sintering the mix by means of firing to obtain the slab article, and a step f) of controlled cooling of the resultant article.

The firing step e) may be performed in a roller furnace at a temperature of about 1.200° C., preferably at a temperature close to 1.180° C.

The vacuum vibro-compression step may be performed by means of ram press for the simultaneous application of a mechanical pressure and a vibratory movement with a predefined frequency and for a predetermined time.

The drying step is performed in order to eliminate the water from the mix and may also help activate the binder.

Advantageously, before the firing step, a step may be envisaged for depositing and drying a layer of refractory material (known as "slip") on the bottom surface of the dried slab, in order to prevent adhesion of the slab to the furnace rollers.

During the sintering step, the dried article is fired at a temperature close to 1.200° C., preferably between 1.150°

C. and 1.200° C., in particular between 1.170° C. and 1.190° C. The firing temperature during the sintering step is preferably close to 1.180° C.

Finally, the controlled cooling step involves the transfer of the slab at the end of the firing step into a zone where there is a controlled and decreasing temperature in the direction of feeding of the slab.

This step, as already indicated above, is crucial for manufacturing the slab article according to the present invention because it is the step which causes the at least partial devitrification and crystallization of the glass frit.

In particular, the cooling step f) must be conducted in a controlled manner by modulating the cooling speed within the predefined temperature range of between 1.160° C. and 1.000° C.

In this way it is ensured that the slab article remains within the temperature range of between 1.160° C. and 1.000° C. for a period of at least one minute.

Using a glass frit having the composition indicated above it has been found that, as a result of the controlled cooling step, the resultant glass-ceramic slab article assumes a deep and translucid white colour throughout the thickness of said slab, so that any machining operations for possible conversion of the slab into specific articles may be performed.

Moreover, in a manner similar to that described for the cooling step, the firing step may also be performed by selectively modulating the heating speed in one of the temperature ranges indicated above in order to perform the at least partial devitrification and crystallization of the glass frit.

In particular, the at least partial devitrification and crystallization of the glass frit may be performed in the temperature range of between 1.050° C. and 1.150° C. indicated above.

Advantageously, the temperature range during the firing and cooling steps is passed through in a time period of between about 5 and 8 minutes and a time period of between about 2 and 4 minutes respectively.

Therefore, the compacted and dried mix is designed to remain within one of the temperature ranges indicated above in order to perform the devitrification and crystallization of the glass frit for an overall time period, between firing and cooling, close to at least about 10 minutes.

From the above description it is now clear how with the production method and the glass frit used for producing the mix intended for the production of slab articles it is possible to obtain a particular colouring of the article.

In fact, owing to the predefined amount of alumina and the at least partial devitrification/crystallization process it is possible to obtain a white colour of the finished article, unless a further pigment is added to the mix.

Moreover, the weight amounts of the other elements forming the glass frit must also be calibrated on the basis of the weight amount of the alumina.

The invention claimed is:

1. A method for manufacturing slab articles from a base mix, comprising following steps:
   (a) preparing a mix comprising a preponderant amount, greater than 70% by weight, of glass frit and at least one binder;
   (b) distributing the mix in a support or in a forming mould;
   (c) compacting the mix contained in the support or in the slab forming mould;
   (d) drying the compacted mix;
   (e) sintering the compacted and dried mix by means of firing and obtaining the slab article; and
   (f) controlled cooling of the slab article;
   characterized in that the glass frit comprises:
      a weight amount of silica ($SiO_2$) comprised between 62% and 68% relative to an overall weight of the frit;
      a weight amount of alumina ($Al_2O_3$) comprised between 3% and 5% relative to the overall weight of the frit;
      a weight amount of potassium oxide ($K_2O$) comprised between 3% and 5% relative to the overall weight of the frit;
      a weight amount of calcium oxide (CaO) comprised between 18% and 26% relative to the overall weight of the frit; and
      a weight amount of magnesium oxide (MgO) comprised between 1% and 4% relative to the overall weight of the frit; and
      wherein the step of controlled cooling is performed in a controlled manner by modulating a cooling speed within a predefined temperature range not greater than 1160° C. and not less than 1000° C. in order to perform at least partial devitrification and crystallization of the glass frit.

2. The method according to claim 1, characterized in that said predefined temperature range is comprised between 1100° C. and 1000° C.

3. The method according to claim 1, characterized in that said predefined temperature range is comprised between 1150° C. and 1050° C.

4. The method according to claim 1, characterized in that, in addition to said step of controlled cooling, said step of sintering is also performed in a controlled manner by modulating a heating speed within said predefined temperature range in order to perform the at least partial devitrification and crystallization of the glass frit.

5. The method according to claim 1, characterized in that the step of compacting of the mix is performed by means of vacuum vibro-compression.

6. The method according to claim 1, characterized in that the predefined temperature range during the step of controlled cooling for the at least partial devitrification and crystallization of the glass frit is passed through within a time period of at least one minute.

7. The method according to claim 1, characterized in that the predefined temperature range during the steps of sintering and controlled cooling is passed through within a time period of between about 5 and 8 minutes and a time period of between about 2 and 4 minutes, respectively.

8. The method according to claim 1, characterized in that at end of the method the slab article has a white colour.

9. The method according to claim 1, characterized in that said binder is an inorganic binder and/or an organic binder.

10. The method according to claim 9, characterized in that said inorganic binder is an aqueous dispersion of colloidal silica.

11. The method according to claim 9, characterized in that said organic binder is chosen from the group comprising polyvinyl alcohol, water-soluble cellulose and a polysaccharide.

12. The method according to claim 1, characterized in that the slab article has a hardness greater than or equal to 5 Mohs.

13. The method according to claim 1, characterized in that the step of sintering is performed in a furnace at a temperature of not greater than 1200° C.

14. The method according to claim 1, characterized in that the mix, in addition to the glass frit, comprises an amount of about 5-15% by weight of feldspar and/or clay minerals.

15. The method according to claim 13, characterized in that the step of sintering is performed in a furnace at a temperature of not greater than 1180° C.

16. The method according to claim 14, characterized in that the feldspar and/or clay minerals comprise kaolin.

\* \* \* \* \*